United States Patent [19]

Mazzocchi

[11] 4,307,462
[45] Dec. 22, 1981

[54] SYNCHRONOUS DEMULTIPLEXER WITH ELASTIC DUAL-MEMORY BIT STORE FOR TDM/PCM TELECOMMUNICATION SYSTEM

[75] Inventor: Gabriele Mazzocchi, Piacenza, Italy

[73] Assignee: Societa Italiana Telecomunicazioni Siemens S.p.A., Milan, Italy

[21] Appl. No.: 90,617

[22] Filed: Nov. 2, 1979

[30] Foreign Application Priority Data

Nov. 6, 1978 [IT] Italy .............................. 29455 A/78

[51] Int. Cl.³ .......................... H04J 3/06; H04J 3/07
[52] U.S. Cl. .................................................. 370/102
[58] Field of Search ............................. 370/102, 100

[56] References Cited

U.S. PATENT DOCUMENTS

| | | | |
|---|---|---|---|
| 3,042,751 | 2/1962 | Graham | 370/102 |
| 4,072,826 | 2/1978 | Aveneau | 370/102 |
| 4,076,964 | 2/1978 | Herrion | 370/100 |
| 4,158,108 | 6/1979 | LePabic | 370/102 |

*Primary Examiner*—David L. Stewart
*Attorney, Agent, or Firm*—Karl F. Ross

[57] ABSTRACT

A synchronous demultiplexer at a receiving station of a TDM/PCM telecommunication system, operating on an incoming bit stream organized in frames of 32 time slots of eight bits each, comprises a pair of substantially identical random-access memories each having 32 cells loaded with consecutive octets in successive time slots of a frame period P' under the control of a writing-address generator, stepped by clock pulses CK' extracted from the bit stream, and unloaded at a similar but not exactly identical rate in successive time slots of a period P" under the control of a reading-address generator, stepped by locally generated clock pulses CK". Writing as well as reading addresses are fed to both memories simultaneously but the two memories are loaded in alternate frame periods P' and unloaded in alternate frame periods P" under the control of selection signals in the form of two square waves respectively derived from clock pulses CK' and CK". When the relative drift of these clock pulses causes an almost complete overlap of the loading and unloading periods of one of the memories, a logic circuit forming part of a control unit reverses one of these square waves to reseparate the two operations.

4 Claims, 4 Drawing Figures

SYNCHRONOUS DEMULTIPLEXER WITH ELASTIC DUAL-MEMORY BIT STORE FOR TDM/PCM TELECOMMUNICATION SYSTEM

CROSS-REFERENCE TO RELATED APPLICATION

This application relates to subject matter contained in my copending application Ser. No. 085,795, filed Oct. 17, 1979, whose disclosure is hereby incorporated by reference in the present application.

FIELD OF THE INVENTION

My present invention relates to a synchronous demultiplexer for a time-division-multiplex (TDM) communication system of the pulse-code-modulation (PCM) type and, more particularly, to an elastic bit store for such a demultiplexer.

BACKGROUND OF THE INVENTION

In such a telecommunication system, bit groupings such as 8-bit bytes or octets from several lower-order frames are interleaved at a transmitting terminal in a higher-order frame for subsequent redistribution to respective channels at a remote receiving terminal. Thus, the bit stream arriving at the latter terminal is organized in a succession of frames of m time slots each encompassing a group of n bits, with m=32 in many instances.

The recurrence rate of these n-bit groups in the arriving bit stream is determined by a clock at the transmitting end whose cadence may be reconstituted at the receiving terminal by a sync extractor operating as a so-called line clock. The rerouting of the interleaved bit groups at the demultiplexer output, however, must be controlled by clock pulses from a local source (also referred to as a "machine clock") whose frequency generally differs, however slightly, from that of the line clock. This is particularly the case with international communications where there is no central clock available for controlling the operations of equipment linked with both terminals. Differences in timing will also arise from the suppression of certain supervisory bits which travel with the message bits over the PCM signal path but which are no longer required on the channels to which the incoming bit groups are distributed, e.g. as described in commonly owned U.S. Pat. No. 4,147,895. That prior patent also discloses an expandable memory, serving as an elastic bit store, which is loaded under the control of clock pulses extracted from the incoming bit stream and is unloaded under the control of locally generated clock pulses of slightly different cadence.

The use of such an elastic bit store is designed to minimize the loss of information due to the disparity of the two clock-pulse cadences. Moreover, the lack of synchronism between the two clocks requires the provision of means for preventing the simultaneous appearance of loading and unloading commands which would impair the operation of the bit store. In the aforementioned prior patent this problem is solved by the use of an adjustable oscillator as the source of local clock pulses, the frequency of that oscillator being continuously adjusted by a phase comparator with inputs connected to a pair of counters respectively controlling the loading and the unloading of an n-stage buffer register. That solution, however, is inapplicable to a demultiplexer whose output side receives clock pulses from a source of fixed frequency, as where that source must also control operations in other parts of the system.

A demultiplexer as disclosed in my above-identified copending application comprises an input register connected to the incoming signal path for temporarily receiving successive n-bit groups from the arriving bit stream, synchronization means for extracting a train of first clock pulses CK' with cycles T' from that bit stream (a cycle T' corresponding to one of the m time slots constituting a frame), a local source of second clock pulses CK" with cycles T"≈T', storage means with m cells accommodating respective n-bit groups and with a loading connection to the input register as well as an unloading connection to an output register, and distributing means connected to the latter register for routing successively read-out n-bit groups to different outgoing channels. A first address generator is stepped by clock pulses CK' every cycle T' for identifying a cell of the storage means in which an n-bit group present in the input register is to be written, preferably via an interposed buffer register, by way of the aforementioned loading connection; analogously, a second address generator is stepped by clock pulses CK" every cycle T" for identifying a cell from which an n-bit group is to be read out to the output register by way of the unloading connection. A first timer driven by clock pulses CK' generates two interleaved sets of loading pulses with a recurrence period equal to a cycle T' and of a length corresponding to a minor fraction of that recurrence period, preferably T'/n. A second timer driven by clock pulses CK" generates a set of unloading pulses with a recurrence period equal to a cycle T" and of a length corresponding to a minor fraction of the latter period which, as noted above, is very close to the recurrence period of the loading pulses; the length of the unloading pulses is substantially double that of the loading pulses, with only one half of each unloading pulse constituting the actual reading command. A gating circuit connected to the first timer passes either of the two interleaved sets of loading pulses under the control of switchover means such as a coincidence gate connected to the two timers so as to give passage only to loading pulses not coinciding with any unloading pulse. The two address generators are alternately connected to an address input of the storage means with the aid of commutating means, responsive to the loading pulses passed by the gating circuit and to the unloading pulses interleaved therewith, for directing the writing and reading operations. Instead of the loading pulses, the unloading pulses could be duplicated for selective suppression to avoid a coincidence.

OBJECT OF THE INVENTION

Even though such a demultiplexer positively prevents the simultaneous occurrence of writing and reading commands, the readout of a bit group from a given storage cell immediately after it has been written in that cell, i.e. in the same time slot, is still undesirable since it may result in mutilations or reading errors. Thus, the object of my present invention is to provide means for insuring that reading of data in any cell will occur well after such data have been written therein, preferably not less than a full time slot later.

SUMMARY OF THE INVENTION

In accordance with my present invention, the storage means loaded from the input register and unloaded into the output register includes a pair of substantially identical memories of m cells each which are simultaneously addressed via suitable switchover means by the aforementioned first and second address generators in the presence of a writing command or a reading command, respectively, each address generator identifying a pair of homologous cells in the two memories. Only one memory at a time, however, receives the writing or reading instruction as determined by the logical value of a first and a second binary selection signal respectively accompanying the writing and reading commands. Each selection signal is applied in relatively inverted form to respective enabling inputs of the two memories; the first selection signal assumes different values in alternate incoming-frame periods $mT'$ whereas the second one assumes different values in alternate outgoing-frame periods $mT''$. As long as the two selection signals are relatively inverted or overlap only in part, the cells loaded and unloaded in a given time slot will either lie in different memories or be well separated within the same memory. Since, however, the two selection signals are derived from the two clock-pulse trains whose cycles $T'$ and $T''$ are not exactly identical, a near-coincidence between periods of like binary value of the two selection signals will unavoidably occur from time to time. In order to prevent this coincidence from becoming so complete as to result in the loading and unloading of the same cell in one time slot, I further provide control means connected to the two timers for relatively inverting the two selection signals (specifically by inverting the signal accompanying the reading commands in the embodiment particularly described hereinafter) upon detection of such near-coincidence.

Pursuant to a more particular feature of my invention, the two selection signals are square waves which are respectively sampled by the switchover means in the presence of writing and reading commands. One of the timers, namely the one driven by clock pulses CK′ in the specific embodiment, emits a monitoring pulse at the beginning of every full cycle of its square wave while the other timer emits a reference pulse at the beginning of every half-cycle of the square wave associated therewith. These monitoring and reference pulses are fed to logical circuitry included in the control means, that circuitry shifting the last-mentioned square wave by half a cycle in response to a coincidence of these pulses with each other in the presence of a predetermined level of that square wave.

BRIEF DESCRIPTION OF THE DRAWING

The above and other features of my invention will now be described in detail with reference to the accompanying drawing in which.

SPECIFIC DESCRIPTION

Figure 1:
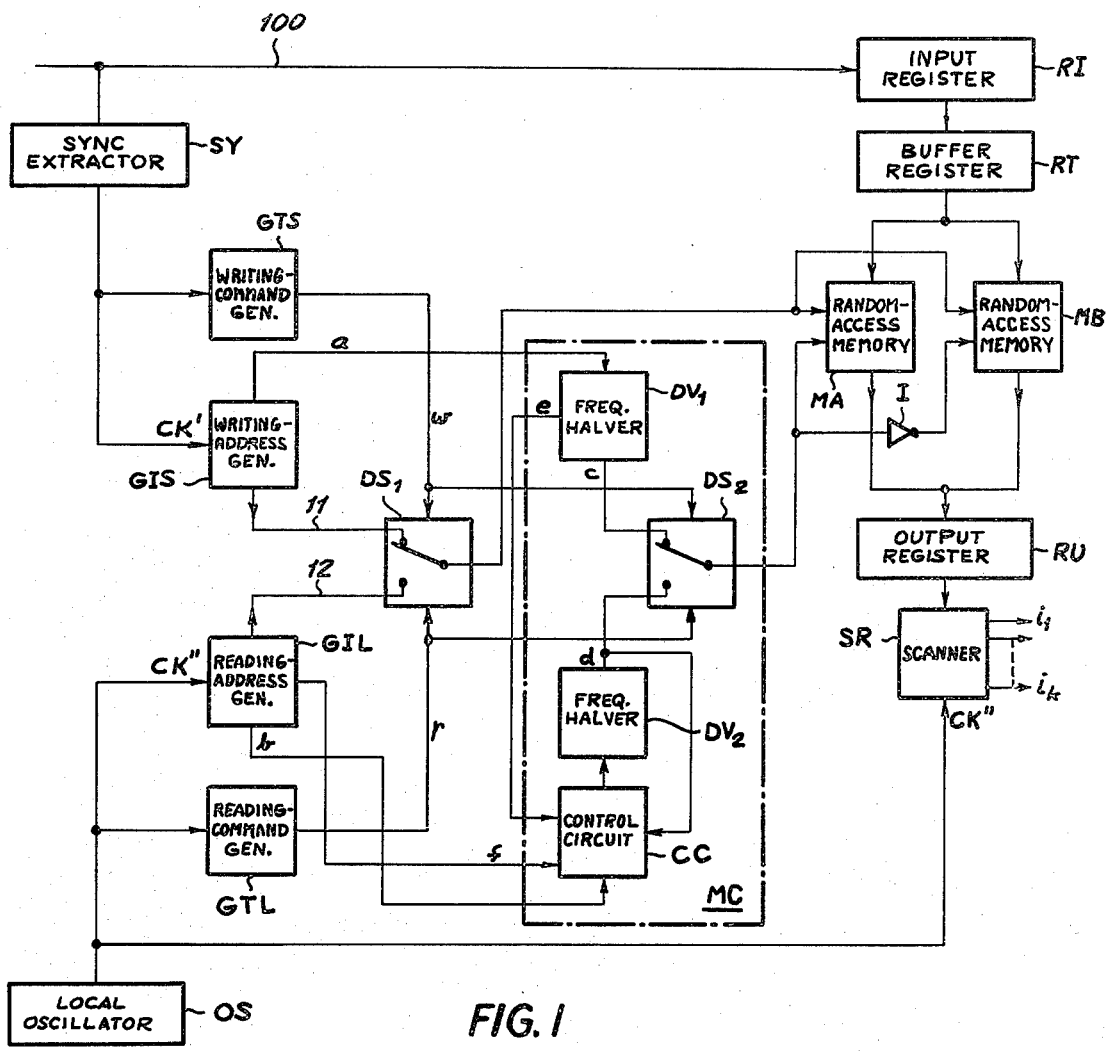
FIG. 1 is a block diagram of a demultiplexer including an elastic bit store according to my invention.

The demultiplexer illustrated in FIG. 1, connected to an incoming signal path 100, comprises an 8-stage input register RI for the temporary storage of 8-bit bytes forming part of an arriving bit stream. The latter is organized in a succession of frames each subdivided into 32 time slots of duration $T'=3.9$ μsec, corresponding to a frame length $P'$ of 125 μsec. Each bit, accordingly, has a length $t=488$ nsec.

Register RI, serially receiving the incoming bits, discharges them eight at a time in parallel into an 8-stage buffer register RT at the end of each time slot $T'$, under the control of clock pulses CK′ derived from the bit stream by a conventional sync extractor SY connected to line 100; for the sake of simplicity, the connections between sync extractor SY and registers RI, RT have not been illustrated.

The bytes stored in buffer register RT are transferred, in consecutive clock cycles $T'$ of a frame period $P'$, to respective cells of one of two identical 32-cell random-access memories MA, MB under the control of a writing-address generator GIS stepped by clock pulses CK′. A reading-address generator GIL, stepped by clock pulses CK″ from a local oscillator OS, controls the sequential readout of these bytes from designated cells of either memory into parallel inputs of an 8-stage output register RU from which their bits are serially transmitted to a scanner SR also stepped by clock pulses CK″. The scanner distributes consecutive bytes to a plurality of outgoing channels $i_l - i_k$ to re-establish the original lower-order frames, k being generally a number less than m (e.g. 4 as in the prior patent referred to).

Figure 2:
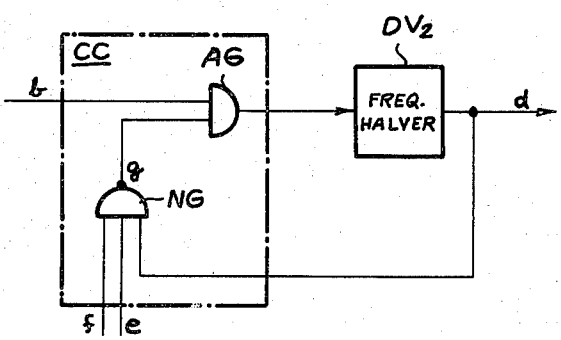
FIG. 2 shows details of a control circuit forming part of the demultiplexer illustrated in FIG. 1.
Figure 3A:
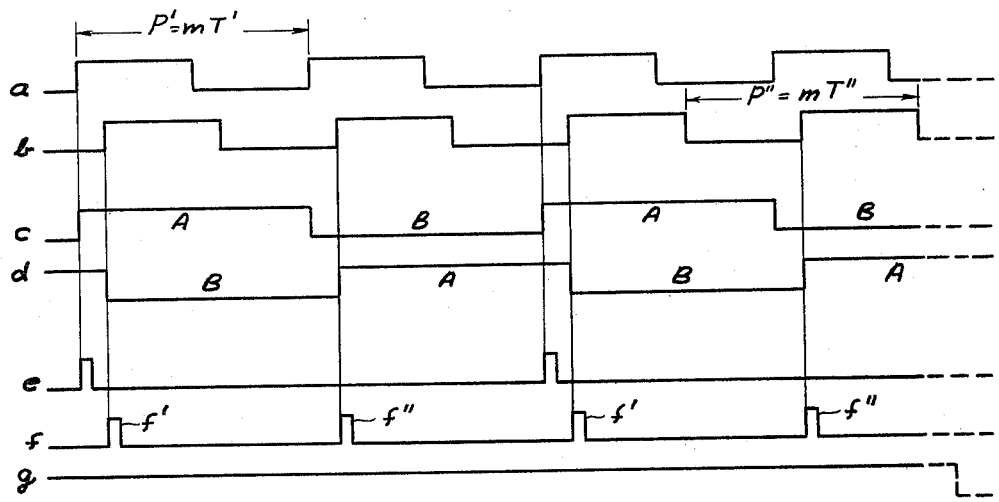
FIGS. 3A, 3B are sets of graphs relating to the operation of the demultiplexer.
Figure 3B:
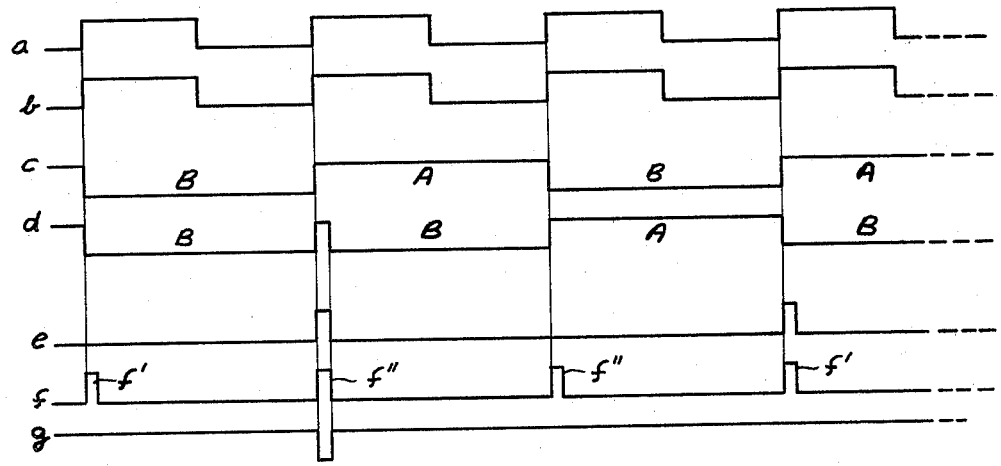

Writing commands w, issuing with a periodicity of $T'$ from a pulse generator GTS in response to clock pulses CK′, and reading commands r, issuing with a periodicity $T''$ from another pulse generator GTL in response to clock pulses CK″, are applied in parallel to corresponding pairs of switching inputs of two electronic commutators $DS_1$ and $DS_2$; commutator $DS_2$ forms part of a memory-selection unit MC which includes two frequency halvers $DV_1$, $DV_2$ and a control circuit CC more fully illustrated in FIG. 2. The reading commands r are maintained interleaved with the writing commands w by means not illustrated, preferably in conformity with the teaching of my above-identified copending application. Address generators GIS and GIL are, in effect, 32-pulse counters which, besides emitting binary cell-identification codes on respective outputs 11 and 12, generate two square waves a and b as shown in FIGS. 3A and 3B. Square wave a steps the divider $DV_1$ (which could also form part of generator GIS) and gives rise to a square wave c each of whose half-cycles has a duration equal to a frame period $P'=32T'$. Similarly, square wave b steps the divider $DV_2$ to produce another square wave d with a half-cycle equal to $P''=32T''$. The latter divider, however, is stepped by signal b not directly but through the intermediary of control circuit CC to which wave d is fed back and which also receives two sets of pulses e and f from the two timing circuits GIS, GIL driven by clock pulses CK′ and CK″, respectively. More particularly, and as illustrated in FIGS. 3A and 3B, a monitoring pulse e is generated at the beginning of each positive half-cycle of wave c whereas a reference pulse f occurs at approximately twice that rate at the beginning of every half-cycle of wave d, i.e. on every rising edge of binary stepping signal b.

Commutator $DS_2$, operating in synchronism with commutator $DS_1$, delivers square wave c (in the presence of a writing command w) or square wave d (in the presence of a reading command r) to an enabling input of memory MA and via an inverter I to a corresponding input of memory MB, concurrently with the arrival of a writing address from generator GIS or a reading address from generator GIL at other inputs of these memories connected in parallel to commutator $DS_1$.

As illustrated in FIG. 2, control circuit CC comprises a NAND gate NG with three inputs, respectively receiving wave d and pulse trains e and f, whose output signal g is fed to one input of an AND gate AG having another input connected to generator GIL to receive the stepping signal b. Divider $DV_2$ is a simple flip-flop whose switching input is connected to the output of AND gate AG and which is alternately set and reset by the rising edges of wave b. Divider $DV_1$ of FIG. 1 essentially comprises a similar flip-flop periodically switched by rising edges of wave a.

Reference pulses f are divided into two alternating groups f′ and f″, the former coinciding with a low level (zero or negative) and the latter with a high level (positive) of wave d. Thus, a pulse f′ will not cut off the NAND gate NG even when coinciding with a pulse e. On the other hand, a coincidence of pulses f″ and e in the input of NAND gate NG will cause such cutoff since the signal d fed back to the third input of this gate will then also be high; as a consequence, AND gate AG will be blocked by the disappearance of signal g as long as pulses f″ and e coincide. Advantageously, pulses e and f should have a minimum width substantially corresponding to a time slot T′.

In FIG. 3A each reference pulse f″ happens to lie about midway between two monitoring pulses e. Thus, the two selection signals c and d are nearly in phase opposition with each other, such opposition representing an optimum operating condition causing the bytes of one incoming frame to be written in the cells of memory MA while the bytes of the immediately preceding frame are read out from the cells of memory MB, or vice versa. References A and B in FIGS. 3A and 3B, representing synchronization codes conventionally identifying alternate frames in a PCM system, indicate the enablement of memory MA during high levels and of memory MB during low levels of square waves c and d.

Such a favorable phase relationship, however, will generally be maintained only for a limited period and eventually will give way to the situation illustrated in FIG. 3B where not only the stepping waves a and b but also the selection signals c and d are substantially in phase so that a monitoring pulse e coincides with or at least overlaps a reference pulse f″. When this occurs, the output signal g of NAND gate NG drops from its previous high value to a low level so that stepping signal b, which has just switched the divider $DV_2$ to start a positive half-cycle of wave d, is temporarily interrupted. Upon the subsequent return of signal g to its high level, divider $DV_2$ is stepped once more—out of turn—so that wave d changes to its alternate level for the remainder of frame period P″, being effectively shifted by 180°. There will thus occur two pulses f″ in immediate succession, but the second one will not coincide with a pulse e. In the next frame period, therefore, the two waves c and d are again in phase opposition, thereby re-establishing the favorable situation discussed with reference to FIG. 3A.

As a result of this phase shift, the bytes stored during the current frame period P′ in the memory activated for loading (here memory MA) will be read out either twice or not at all, depending on the direction of the relative phase drift of clock pulses CK′ and CK″. This, however, is a minor inconvenience compared with the prolonged impairment of communication which would otherwise occur.

It will be apparent that the system shown in FIG. 1 would operate in essentially the same way if control circuit CC were inserted in the path of stepping signal a rather than signal b, with interchange of the recurrence rates of pulses e and f.

I claim:

1. A demultiplexer for an incoming bit stream organized in a succession of frames of m time slots each encompassing a group of n bits arriving over a signal path, comprising:

input register means connected to said signal path for temporarily receiving successive n-bit groups;

synchronization means connected to said signal path for extracting a train of first clock pulses with cycles T′, corresponding to said time slots, from said incoming bit stream;

a local source of second clock pulses with cycles $T'' \approx T'$;

storage means including a pair of substantially identical memories, each provided with m cells accommodating respective n-bit groups, communicating via a common loading connection with said input register means;

output register means linked by a common unloading connection to each of said memories for receiving successive n-bit groups from said storage means;

distributing means connected to said output register means for routing said n-bit groups to different outgoing channels;

first address-generating means stepped by said first clock pulses every cycle T′ for identifying a pair of homologous cells of said memories in one of which an n-bit group present in said input register means is to be written via said loading connection;

second address-generating means stepped by said second clock pulses every cycle T″ for identifying a pair of homologous cells of said memories from one of which an n-bit group is to be read out to said output register means via said unloading connection;

first timing means driven by said first clock pulses for generating a series of writing commands having a recurrence period equal to a cycle T′ and a length corresponding to a minor fraction of their recurrence period, accompanied by a first square wave having half-cycles coinciding with respective incoming-frame periods mT′;

second timing means driven by said second clock pulses for generating a series of reading commands having a recurrence period equal to a cycle T″ and a length corresponding to a minor fraction of their recurrence period, said reading commands being interleaved with said writing commands and being accompanied by a second square wave having half-cycles coinciding with respective outgoing-frame periods mT″;

switchover means responsive to said first and second timing means for connecting an address input of each of said memories to said first address-generating means while feeding a sample of said first square wave in relatively inverted form to respective enabling inputs of said memories in the presence of each writing command and for connecting said address input of each of said memories to said second address-generating means while feeding a sample of said second square wave in relatively inverted form to said respective enabling inputs in the presence of each reading command; and control means connected to said first and second timing means for detecting a near-coincidence between corresponding half-cycles of said first and second square waves and thereupon relatively inverting said square waves, one of said timing means emitting a monitoring pulse at the beginning of every full cycle of the square wave generated thereby, the other of said timing means emitting a reference pulse at the beginning of every half-cycle of the square wave generated thereby, said control means comprising logical circuitry responsive to a coincidence of a monitoring pulse with a reference pulse in the presence of a predetermined level of the last-mentioned square wave for shifting the latter by 180°.

2. A demultiplexer as defined in claim 1 wherein said other of said timing means includes a frequency halver with a switching input driven by a stepping signal having twice the frequency of said last-mentioned square wave, said logical circuitry including gating means for temporarily introducing an extraordinary discontinuity in said stepping signal in response to said coincidence.

3. A demultiplexer as defined in claim 2 wherein said gating means comprises a NAND gate with one input receiving said monitoring pulse, another input receiving said reference pulse and a third input connected to an output of said frequency halver, and an AND gate upstream of said switching input having one input connected to the output of said NAND gate and having another input receiving said stepping signal.

4. A demultiplexer as defined in claim 2 or 3 wherein said monitoring and reference pulses are emitted by said first and second timing means, respectively.

* * * * *